Dec. 13, 1966  A. J. LAUBE  3,290,831
APPARATUS FOR GRINDING WHITE SIDEWALL TIRES
Original Filed Dec. 13, 1962  3 Sheets-Sheet 1
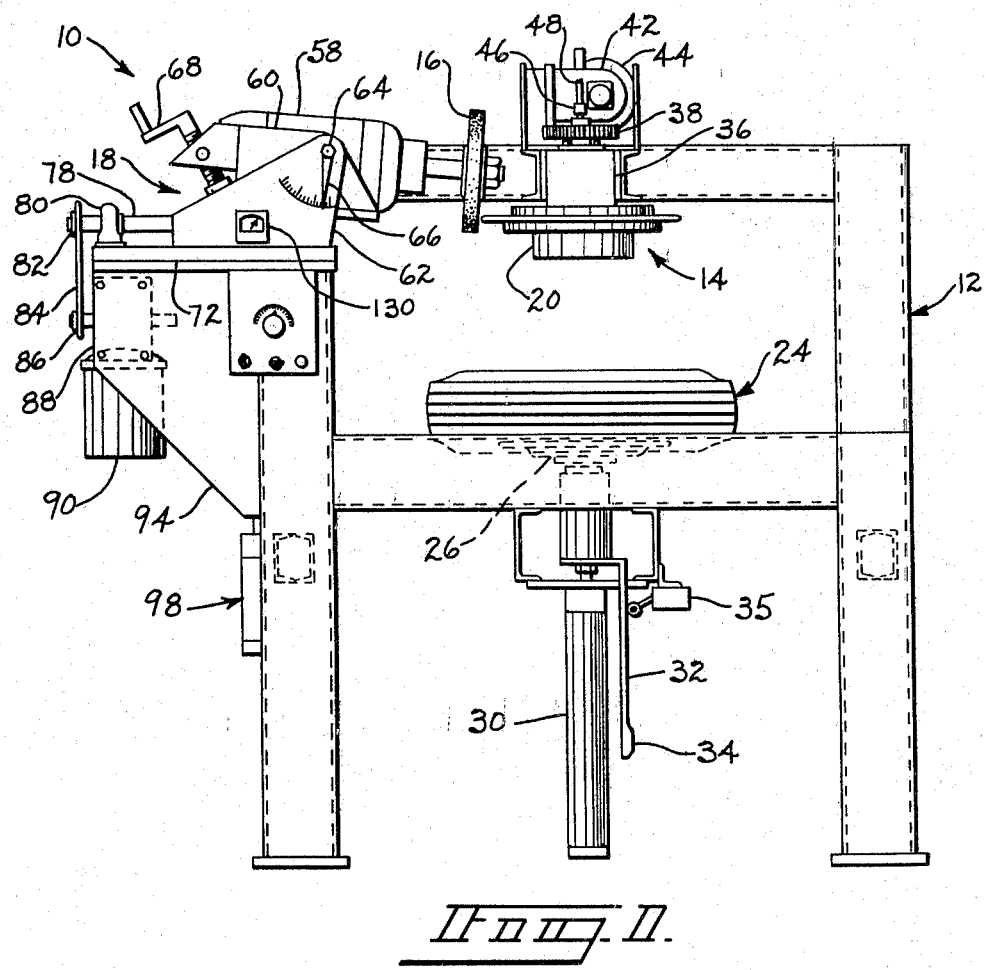
*Fig. 2.*
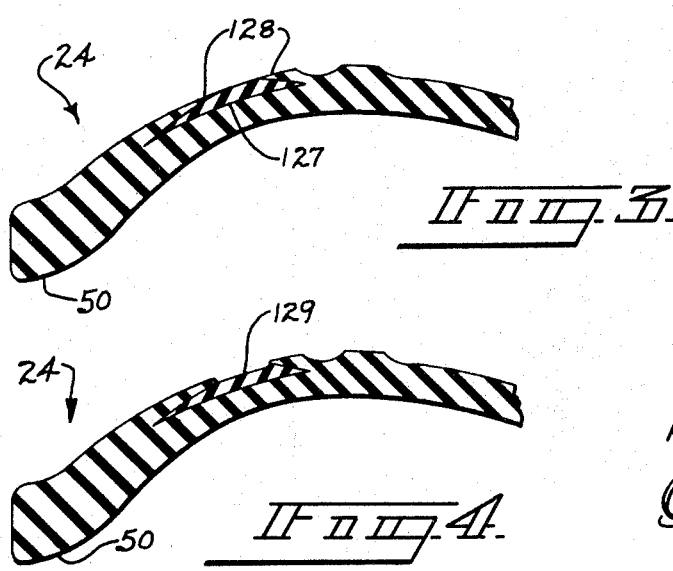
*Fig. 3.*
*Fig. 4.*
INVENTOR.
ALFRED J. LAUBE
ATTORNEYS

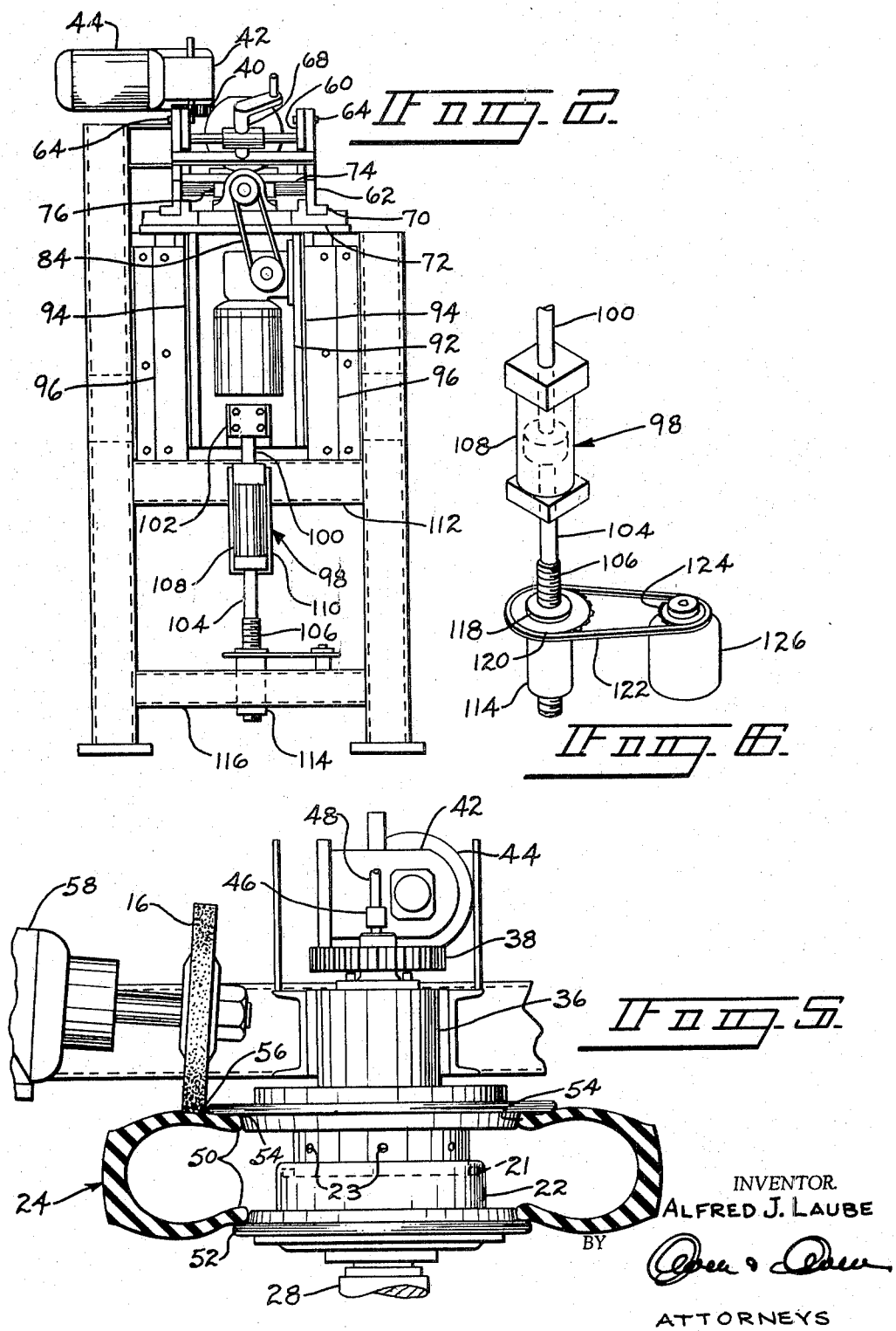

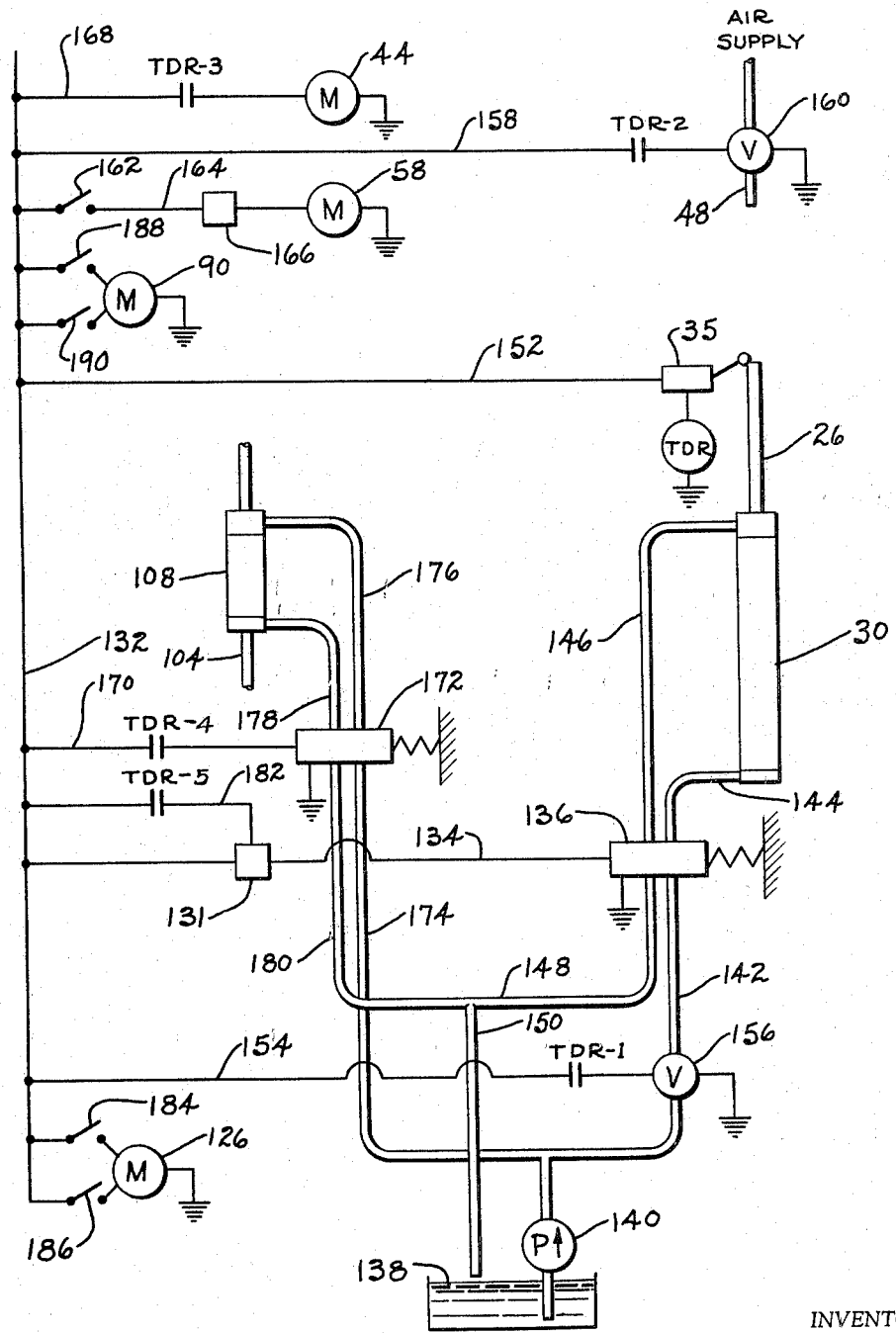
Fig. II.
INVENTOR.
ALFRED J. LAUBE

United States Patent Office 3,290,831
Patented Dec. 13, 1966

3,290,831
APPARATUS FOR GRINDING WHITE SIDEWALL TIRES
Alfred J. Laube, Findlay, Ohio, assignor to Cooper Tire and Rubber Company, Findlay, Ohio, a corporation of Delaware
Original application Dec. 13, 1962, Ser. No. 244,348, now Patent No. 3,172,243, dated Mar. 9, 1965. Divided and this application June 22, 1964, Ser. No. 384,015
6 Claims. (Cl. 51—106)

This application is a division of my application Ser. No. 244,348, filed Dec. 13, 1962, now Patent 3,172,243, dated March 9, 1965.

This invention relates to apparatus for grinding the sidewalls of pneumatic tire casings and particularly for finishing the edges of narrow, annular stripes of contrasting color, usually white, in such sidewalls.

A white sidewall tire is laid up in the same manner as a black sidewall tire, except that a strip of white rubber is interlaid at that portion of the sidewall where the stripe is to be located in the finished tire. If the tire is to have a wide white stripe a thin sheet or layer of black rubber is subsequently placed over one edge of the white rubber strip. If the tire is to have a narrow stripe, a second such layer is added so as to overlay the other edge of the white rubber.

After the tire is formed and cured, at least some of the white stripe or band is visible with at least one edge of the stripe being determined by the edge of the overlying black rubber layer. This edge is not circular, nor is it concentric with the tire, because of the human element involved in laying up the tire by hand and also because of non-uniformity in the flow of the rubber during vulcanization and curing. Therefore, it becomes necessary to perform a finishing step to provide a uniform, circular edge or edges on the white stripe by removing a portion of the over-lying black rubber layer.

The finishing of white sidewall tires having wide stripes, which were prevalent up to a few years ago, was relatively easy. Such tires were designed so that the inner circular edge of the white stripe of such a tire terminated at the bead and did not require any finishing whatsoever and the outer circular edge of the stripe almost always terminated at an abrupt change in the surface contour of the tire. With this arrangement, the stripe was easily finished by grinding away, for example, with an abrasive belt, the thin black laminate which overlay the white rubber strip adjacent the abrupt surface change, using the abrupt change to define the edge of the white stripe.

With the advent of white sidewall tires having narrow white stripes, the finishing operation has become increasingly difficult particularly when the white stripe is recessed for protection against damage during use of the tire. Both edges of the stripes of these tires must be finished and the stripe is seldom, if ever, adjacent an abrupt surface change which can be used to define one edge of the stripe. Furthermore, in order to provide a recessed white stripe, a portion of the white rubber also must be removed.

Another problem of increasing difficulty results from the ever wider variation of tires, because of the choice between tube and tubeless tires, rayon and nylon tire cord, snow and regular treads, and a wide range of tire sizes. Because of this variation, any machine for finishing the edges of white sidewall stripes should have grinding means the position of which can be changed relatively easily so that one machine can perform the operation upon a wide variety of tires and can be changed from a setting for one style or size of tire to another, with a minimum of effort and time.

According to the invention, a grinding wheel is used in place of an abrasive belt to accomplish the above objectives and the position of the grinding wheel can be closely controlled and readily varied in its horizontal and vertical positions and in its plane of rotation.

The rate of grinding also must be closely controlled when the white rubber is being removed because this rubber is soft and easily abraded. It has been found that if the white rubber is removed at an excessively rapid rate, a rough surface is produced which is subject to rapid soiling. The present invention further provides an improved apparatus for maintaining the proper control over the rate of rubber removal by the grinding wheel to assure that a smooth surface will be produced for the stripe.

In a tire having a recessed white stripe the recess must be of a uniform depth. Because tires, even of the same nominal size, are not always of uniform dimensions, the depth of the recessed stripe varies from tire to tire and in different portions of the same tire. The present invention provides a means by which the surface of the tire adjacent the stripe is positioned in a uniform manner and in a fixed plane, regardless of non-uniformities in the tire and the recess depth determined therefrom in order to produce the desired uniform recess in the white rubber forming the stripe.

It is, therefore, a principal object of the invention to provide apparatus for grinding the edges of a white stripe in a white sidewall tire, in particular a narrow white stripe, and to produce a smooth finish on the white rubber constituting the stripe.

Another object of the invention is to provide an improved apparatus for finishing the edges of white stripes in white sidewall tires of many different sizes and styles, the apparatus being particularly effective for finishing the edges of narrow white stripes.

A further object of the invention is to provide an improved apparatus for grinding a recessed white stripe of uniform depth in a white sidewall tire.

Other objects and advantages of the invention will be apparent from the following detailed description of a preferred embodiment thereof, reference being made to the accompanying drawing, in which:

FIG. 1 is a front view in elevation of a grinding machine embodying the invention;

FIG. 2 is a side view in elevation of the grinding machine shown in FIG. 1, taken from the left side of FIG. 1;

FIG. 3 is an enlarged, fragmentary view in section of the sidewall portion of a white sidewall tire, after vulcanization but before grinding;

FIG. 4 is an enlarged, fragmentary view in section, similar to FIG. 3, of the same tire after grinding, with a finished narrow white stripe therein;

FIG. 5 is a fragmentary view in elevation, on an enlarged scale, of a tire mounting chuck of the machine shown in FIGS. 1 and 2 and showing a tire therein;

FIG. 6 is a somewhat schematic view in perspective of an adjustable stop and a hydraulic hoist for raising and lowering part of the grinding mechanism; and FIG. 7 is a schematic diagram of a control system for a grinding machine embodying the invention, including hydraulic and electrical components.

As used herein, and in the subjoined claims, the term "normal axis" of a tire means the axis normal to the planes of the tire beads and on which the tire rotates when in use on a vehicle.

Referring to the drawings and more particularly to FIGS. 1 and 2, a grinding machine according to the invention is indicated generally by the reference number 10 and includes a frame 12, a tire chuck indicated at 14, a grinding wheel 16, and mounting means for the grinding wheel indicated at 18. The grinding wheel 16 is shown in its grinding position although it usually is higher until a tire is in position and held by the chuck 14.

The chuck 14 includes a hub consisting of an upper part 20 and a lower part 22 (FIG. 5), which are commercially available, with the upper part 20 including lugs 21 for locking the two parts together and ports 23 for supplying air to the interior of a tire 24 held thereby, as is known in the art. The lower hub part 22 is rotatably mounted by a thrust bearing 26 on the upper end of a piston rod 28 of a hydraulic hoist 30 which is supported by the frame 12. The hoist 30 moves the lower part 22 between a lower loading position, shown in FIG. 1, and an upper grinding position, shown in FIG. 5. A trip bar 32 having a trip projection 34 is attached to the piston rod 26 and moves upwardly and downwardly therewith, actuating a limit switch 35 when in the upper position. The purpose of the limit switch 35 will be discussed more fully subsequently.

The upper chuck part 20 is rotatably supported by the frame 12 through a bearing housing 36 and has a driven spur gear 38 thereabove. The spur gear 38 is driven through a pinion 40 (FIG. 2) which is connected to a gear reducer 42 and driven by a motor 44 to rotate the chuck part 20 on an axis which is colinear with the normal axis of the tire 24.

A rotary air supply joint 46 is located just above the spur gear 38 and is connected to an air supply pipe 48 which supplies air to the interior of the upper chuck part 20, when the lower part 22 is raised, to extend the lugs 21 and lock the two parts together and to supply air to the interior of the tire 24 through the ports 23. When the chuck parts 20 and 22 are together, beads 50 of the tire 24 are held securely by a lower supporting rim 52 and an upper supporting rim 54 having a wide flange 56 thereon extending outwardly in a horizontal plane about 1¼ inches to contact the tire 24 at a point close to the portion to be ground. As the tire is inflated, it expands against and is held against further expansion by the flange 56 whereby the surface of the tire adjacent the flange 56 is held in a given horizontal plane. This assures that the grinding wheel 16 will remove rubber to a uniform depth. Otherwise, the non-uniformity in the tire would cause the recessed stripe made by the wheel 16 to vary in depth relative to the non-uniform surface in which it is made. The rims 52 and 54 are detachable from the hub portions 22 and 20 so that larger or smaller diameter rims can be used for different sizes of tires. In each instance, the flange 56 continues to extend well beyond the rim 54 close to the location of the recessed stripe.

The grinding wheel 16 consists of a steel core with tungsten carbide grit embedded on the face thereof. The tungsten carbide layer is thin so that even when the wheel 16 wears to the core, there is little change in diameter of the wheel. The wheel 16 in this instance is driven by an A.C. motor 58, the speed of which can be varied by regulating the frequency of the cycles of the current supplied to the motor, the cycle range varying from 3600 to 7200 r.p.m. in this instance with the grinding wheel 16 driven at speeds up to approximately 8000 r.p.m. A D.C. motor can be used instead, but such a motor is more expensive in speeds above 6000 r.p.m. The wheel 16 also is supplied with dynamic braking for faster stopping.

The surface of the tire in which the white stripe is to be finished usually is at an angle to the horizontal when the normal axis of the tire is vertical, the angle varying for different styles of tires. In order to have the bottom of the stripe parallel to the adjacent tire surface, the plane of rotation of the grinding wheel 16 must be other than vertical in most instances and, further, this plane must be capable of being changed so as to be perpendicular to each tire surface being ground. For this purpose, the grinding wheel 16 and the motor 58 are supported in a cradle 60 which, in turn, is pivotally mounted between brackets 62 by pivot pins 64. A pointer 66 is attached to the front pivot pin 64 and cooperates with indicia on one of the brackets 62 to indicate the angle at which the grinding wheel 16 is positioned. The angle can be changed by means of a jack 68.

The distance from the normal axis to the white stripe varies from tire to tire, depending both on style and size, and to accommodate the variation, the grinding wheel 16 and the motor 58 are moved generally radially inwardly and outwardly with respect to the chuck 14. To accomplish this, the supporting brackets 62 are slidably mounted on ways 70 of a mounting plate 72. The lower portions of the brackets 62 are connected by struts 74, the rear one of which has a thrust block 76 to which a threaded shaft 78 is connected. The shaft 78 is threadedly engaged by a bearing block 80 also mounted on the plate 72 and has a sprocket 82 keyed to its outer end. The sprocket 82 is driven through a chain 84 and a drive sprocket 86 which is connected through a reducer 88 to a motor 90. When the motor drives the sprocket 86 and the driven sprocket 82, the shaft 78 is rotated so that it moves inwardly and outwardly through the threaded bearing block 80, thereby moving the brackets 62 and the grinding wheel 16 radially inwardly and outwardly with respect to the chuck 14. The angle of the grinding wheel 16 does not change, of course, during such movement.

When the tire 24 is engaged by the chuck 14 and is inflated, the grinding wheel 16 is lowered to the position shown in FIG. 1 and into contact with the portion of the tire to be ground. For this purpose, the grinding wheel 16 and the motor 58, as well as the brackets 62, the plate 72, and the motor 90, along with its associated driving mechanism, are moved vertically, being mounted on a vertical plate 92 (FIG. 2) having outwardly extending brackets 94. The plate 92, in turn, is vertically supported by and movable with respect to the frame 12 which has vertical ways 96 cooperating with the plate 92. The entire grinding wheel mounting unit 18 can then be moved vertically by means of a vertical hydraulic hoist 98 having a double-ended piston rod, an upper portion 100 of which is attached to the plate 92 by a bracket 102 and a lower portion 104 of which abuts an adjustable stop 106. A cylinder 108 of the hoist 98 is held by a bracket 110 attached to a cross bar 112 of the frame 12.

The upper limit of movement of the mounting unit 18 and the grinding wheel 16 is not critical but the lower limit, as determined by the stop 106, is important because it determines the extent to which the grinding wheel 16 bears against the tire 24. To vary this position, the thread stop 106 is supported for slidable but non-rotational movement in a guide tube 114 which is supported by a cross member 116 of the frame 12. The stop 106 also is engaged by a threaded ring 118 (FIG. 6) which is rotatably held on the upper end of the guide tube 114. The stop 106 then is raised and lowered when the ring 118 is rotated through a driven sprocket 120 attached to the ring, a chain 122, a drive sprocket 124, and a suitable motor 126. When the stop member 106 is raised, the lower limit of travel of the mounting unit 18 and the grinding wheel 16 also is raised so that the grinding wheel 16 bears against the tire 24 to a lesser extent. When the stop member 106 is lowered, the lower position of the grinding wheel 16 is also lowered and it bears against the tire 24 with more pressure.

The tire 24 to be ground, after it has been vulcanized, is shown in cross section in FIG. 3. A strip 127 of rubber extends along the side wall of the tire at a more or less uniform distance from the bead with thin black rubber layers 128 laying over the edges of the strip 127. A thin portion of the strip 127 is visible between the edges of the layer 128 but this strip is neither uniform nor uniformly spaced from the bead because the strip 127 and the layers 128 are laid up by hand and also because of shifting of the pieces during vulcanization and curing.

The grinding operation forms a white recessed stripe 129 (FIG. 4) in the tire 24, located in the white rubber strip 127 below the layers 128. The white stripe 129 provides a uniform appearance for all tires even though the strip 127 and the layers 128 are not uniform from tire to tire or even for different portions of the same tire.

The soft white rubber of the strip 127 must be ground carefully because a rough surface will otherwise result. If the grinding rate is excessive, the grinding wheel 16 will tend to load up with particles and produce a rough surface on the strip. On the other hand, if the grinding rate is too slow, a less than desirable production rate will result.

It has been found that the surface of the stripe 129 will be rougher than desirable if the load on the grinding wheel causes the current drawn by the motor 58 to exceed a predetermined amount, as indicated on an ammeter 130 (FIG. 1). This results because the load on the motor 58 and the current it draws increase substantially as the wheel 16 begins to load with rubber particles. Factors of the power supply other than current may be more advantageously measured, in some instances, depending on the type of motor used.

A number of factors influence the grinding rate including the surface speed of the grinding wheel 16, the rate of revolution of the tire 24, and the extent to which the wheel 16 bears against the tire 24. To decrease the grinding rate and the load on the motor 58, the surface speed of the grinding wheel 16 can be decreased, the rate of rotation of the tire 24 can be decreased, or the lower limit of the position of the grinding wheel 16 can be raised to decrease the pressure of the wheel 16 on tire 24. It is thereby easy to maintain the current as indicated on the instrument 130 below the predetermined amount and thereby assure the retention of smooth surfaces for the stripe 129.

Other than for an occasional adjustment to prevent excess loading, the machine 10 can be operated very easily. When grinding is to begin, the mounting unit 18 and the grinding wheel 16 are simply lowered until the piston rod 104 contacts the adjustable stop 106. The grinding wheel 16 immediately begins grinding the stripe 129 as the tire 24 rotates, but does not complete the grinding in one revolution of the tire 24 even though the grinding wheel 16 is not lowered farther, because the tire 24 deflects under the pressure of the grinding wheel 16. Hence, additional rubber is removed from the tire 24 during several revolutions thereof even though the position of the grinding wheel 16 is not changed at all, with the resiliency of the tire 24 itself acting to feed the tire to the wheel. When the mounting unit 18 is lowered against the stop, feeding of the tire toward the grinding wheel 16 is thereby accomplished without any further steps or manipulations on the part of the operator. With this technique, each cut during each subsequent rotation of the tire is less than the one before so that the resulting tapering in the depth of cut results in an improved finish, too.

While the salient points of operation of the grinding machine 10 have been discussed, the overall operation of it in connection with a control system shown in FIG. 7 will be set forth. After the tire 24 is placed in the machine with the lower bead 50 resting on the rim 52 of the lower chuck part 22, a latch-trip relay 131 is actuated to complete a circuit through a main lead line 132 and a branch line 134 to a four-way valve 136. This valve is then actuated to direct oil from a sump 138 through a pump 140 and a pipe 142, to an inlet pipe 144 at the blind end of the chuck hoist 30. At the same time, the rod end of the hoist 30 and a hoist line 146 are connected through return lines 148 and 150 to the sump 138. The hoist 30 then raises the piston rod 26 and the lower chuck part 22 until the part 22 nests with the upper chuck part 20, as shown in FIG. 5. At this time, the limit switch 35 is tripped by the projection 34 to complete a circuit through a branch line 152 to a time delay relay designated TDR. The time delay relay immediately begins to time out for a predetermined period, for example two minutes, during which time its contacts TDR–1 in a branch line 154 are closed to actuate a valve 156 in the line 142 which immediately stops the flow of oil to the blind end of the hoist 30 and maintains the piston rod 26 in the position such that the chuck parts 20 and 22 remain nested with the beads 50 of the tire 24 in contact with the rims 52 and 54. The tire 24 thus is in grinding position, except for being inflated.

The time delay relay TDR also closes contacts TDR–2 while timing out, which completes a circuit through a branch line 158 to a valve 160 in the air supply line 48, thereby opening this valve and supplying air to the upper chuck part 20. This first moves the lugs 21 outwardly to engage the lower chuck part 22 and then supplies air to the interior of the tire 24 through the ports 23 to inflate the tire, the beads 50 maintaining sealing contact with the rims 52 and 54.

When the time delay relay TDR begins to time out, it also closes a third set of contacts TDR–3 to complete a circuit through a branch line 168 to actuate the motor 44, which rotates the upper chuck part 20 and, hence, the lower chuck part 22 and the tire 24.

The grinding wheel 16 is already rotating, a manual switch 162 having been closed at the time of the start of the operation to supply current through a line 164 to the motor 58. The speed of the motor 58 can be controlled through variation in the frequency of the cycles, as previously discussed, this being accomplished through a component 166.

With the grinding wheel 16 and the tire 24 rotating, the grinding wheel 16 is lowered by the closing of additional contacts TDR–4 which enable current to be supplied through a line 170 to a four-way valve 172. This directs oil from the pump 140 and the supply line 174 to a hoist line 176 and the upper end of the grinding wheel hoist 110. The lower end of the hoist cylinder 110 is then connected to the sump 138 through a hoist line 178, a line 180, and the line 150. The mounting unit 18 and the grinding wheel 16 are then lowered until the lower piston rod 104 abuts the stop 106 which places the grinding wheel 16 in the desired position against the tire 24, with grinding commencing immediately upon contact.

The grinding continues until the time delay relay TDR has timed out, during which time the tire 24 has made several revolutions, rotating at a speed of perhaps 2–4 r.p.m. During each revolution of the tire 24, an additional amount of rubber is removed, with the amount decreasing upon each pass because the pressure between the wheel 16 and the tire 24 decreases each time more rubber is removed. When the time delay relay has timed out, the grinding wheel 16 is removing little, if any, rubber. The time must be long enough for this to be accomplished, because if the wheel is still removing a considerable amount of rubber, a line will be apparent where the grinding wheel 16 has lifted from the groove 129 and a gradual variation in depth will also exist around the groove 129.

When the relay TDR has timed out, the contacts TDR–1 again open with the valve 156 also opening to supply hydraulic fluid through the line 142 and the line 144 to the blind end of the hoist 30. This causes the piston rod 26 again to continue in the upper direction and move the part 22 further toward the part 20. The rims 52 and 54 thus squeeze the tire 24 and help to push out the air. At the same time, the contacts TDR–2 close the valve 160 to stop flow of air through the line 48 and the contacts TDR–3 open to stop rotation of the upper chuck part 20 by the motor 44. Also, the contacts TDR–4 open to supply oil again through the line 178 to raise the grinding wheel 16. A fraction of a second after the time delay relay TDR has timed out, its contacts TDR–5 in a line 182 close momentarily which trip the latch-trip relay 131 to supply hydraulic fluid again to the rod end of the hoist 30 and reverse the direction of the lower chuck part 22 to lower the tire 24 to its loading and unloading position after the tire 24 has been squeezed momentarily. This completes the overall operation.

The motor 126 is controlled by switches 184 and 186 to control the position of the adjustable stop 106 and the motor 90 is regulated through manually-operated switches 188 and 190 to control the radial position of the wheel 16.

Many other suitable control systems can be used for the grinding machine with that of FIG. 7 being shown for purposes of illustration and not limitation. In addition, many details of the system have been left out for clarity of illustration. For example, manually-operated override buttons can be used to bypass the automatic controls where desirable to modify the grinding operation as needed.

Various modifications of the above-described embodiment of the invention will be apparent to those skilled in the art and it is to be understood that such modifications can be made without departing from the scope of the invention, if they are within the spirit and tenor of the accompanying claims.

What I claim is:

1. Apparatus for finishing the edges of a contrasting stripe in the sidewall of a pneumatic tire, said apparatus comprising means including a chuck for supporting the tire for rotation on its normal axis, said chuck having a first rim for engaging a bead of the tire and a second rim for engaging the other bead of the tire, said first rim having an annular flange extending outwardly from said first rim and terminating near the finished inner edge of the stripe to be ground, and contacting the tire when inflated between the bead and the finished inner edge of the stripe, means for inflating the tire on said chuck, means for rotating said chuck on the normal axis of the tire, a grinding wheel having a cylindrical edge with an axial width no greater than the width of the stripe, means mounting said grinding wheel for rotation on an axis lying substantially in a same plane as and in angular relationship to the axis of rotation of said chuck and the tire, means for changing the angular relationship of the axis of said grinding wheel relative to the axis of said chuck and the tire, means for moving said grinding wheel toward and away from the axis of said chuck and the tire, means for moving said grinding wheel generally parallel to the axis of said chuck and the tire, and adjustable stop means for limiting the parallel movement of said grinding wheel toward the tire.

2. Apparatus for finishing the edges of a contrasting stripe in the sidewall of a pneumatic tire, said apparatus comprising means including a chuck for supporting the tire for rotation on its normal axis, said chuck having a first rim for engaging a bead of the tire and a second rim for engaging the other bead of the tire, said first rim having an annular flange extending outwardly from said first rim and terminating in a plane generally perpendicular to the normal axis of the tire near the finished inner edge of the stripe to be ground, and contacting the tire when inflated between the bead and the finished inner edge of the stripe, means for inflating the tire on said chuck, means for rotating said chuck on the normal axis of the tire, a grinding wheel having an edge with an axial width no greater than the width of the stripe, means mounting said grinding wheel for rotation on an axis lying substantially in a same plane as and in angular relationship to the axis of rotation of said chuck and the tire, means for moving said grinding wheel in a line generally parallel to the axis of said chuck and the tire, and stop means for limiting the movement of said grinding wheel toward the tire.

3. Apparatus for finishing the edges of a contrasting stripe in the sidewall of a pneumatic tire, said apparatus comprising means for inflating the tire and for supporting the tire for rotation on its normal axis, means for rotating said supporting and inflating means on the normal axis of the tire, a grinding wheel having an edge with an axial width equal to the width of the stripe, means mounting said grinding wheel for rotation on an axis lying substantially in a same plane as and in angular relationship to the axis of rotation of said chuck and the tire, means for rotating said grinding wheel on its axis, manually-operated means for changing the angular relationship of the axis of said grinding wheel relative to the axis of said chuck and the tire, means for moving said grinding wheel toward and away from a plane perpendicular to the axis of said chuck and the tire, and motor-operated adjustable stop means for adjustably limiting the movement of said grinding wheel toward the tire.

4. Apparatus for finishing the edges of a contrasting stripe in the sidewall of a pneumatic tire, said apparatus comprising means for inflating the tire and for supporting the tire for rotation on its normal axis, means for rotating said supporting and inflating means on the normal axis of the tire, a grinding wheel having an edge with an axial width equal to the width of the stripe, mean mounting said grinding wheel for rotation on an axis lying substantially in a same plane as and in angular relationship to the axis of rotation of said chuck and the tire, means for rotating said grinding wheel on its axis, manually-operated means for changing the angular relationship of the axis of said grinding wheel relative to the axis of said chuck and said tire to set the axis of said grinding wheel at a fixed, predetermined angle, means for moving said grinding wheel generally radially of the tire, means for moving said grinding wheel, said angle-changing means, said radially moving means, and said grinding wheel rotating means in a line generally parallel to the axis of said chuck and the tire, and stop means for limiting the parallel movement of said grinding wheel toward the tire.

5. In apparatus for finishing the edges of a contrasting stripe in the sidewall of a pneumatic tire having a normal axis, a two-part tire chuck including a first rim for engaging a bead of the tire and a second rim for engaging the other bead of the tire, said first rim having an annular flange extending outwardly from said first rim and terminating in a plane perpendicular to the normal axis near the finished inner edge of the stripe to be ground, and adapted to contact the tire between the bead associated with said first rim and the finished inner edge of the stripe.

6. In apparatus for finishing the edges of a contrasting stripe in the sidewall of a pneumatic tire, a two-part tire chuck including a first rim for engaging a bead of the itre and a second rim for contacting the other bead of the tire, said first rim having an annular flange extending outwardly from said first rim and terminating near the finished inner edge of the stripe to be ground, and adapted to contact the tire when inflated between the bead and the finished inner edge of the stripe, and means for inflating the tire when the beads are engaged by said first and second rim.

References Cited by the Examiner

UNITED STATES PATENTS

| 2,168,596 | 8/1939 | Hall | 51—111 |
| 2,836,016 | 5/1958 | Lowitz | 51—105 |
| 2,986,849 | 6/1961 | Clark | 51—5 |
| 3,001,334 | 9/1961 | Giusti et al. | 51—3 |
| 3,077,060 | 2/1963 | Cooper | 51—105 |

LESTER M. SWINGLE, *Primary Examiner.*